Aug. 23, 1960   E. E. HEWITT   2,949,932
SURGE DAMPENER APPARATUS
Filed June 18, 1959
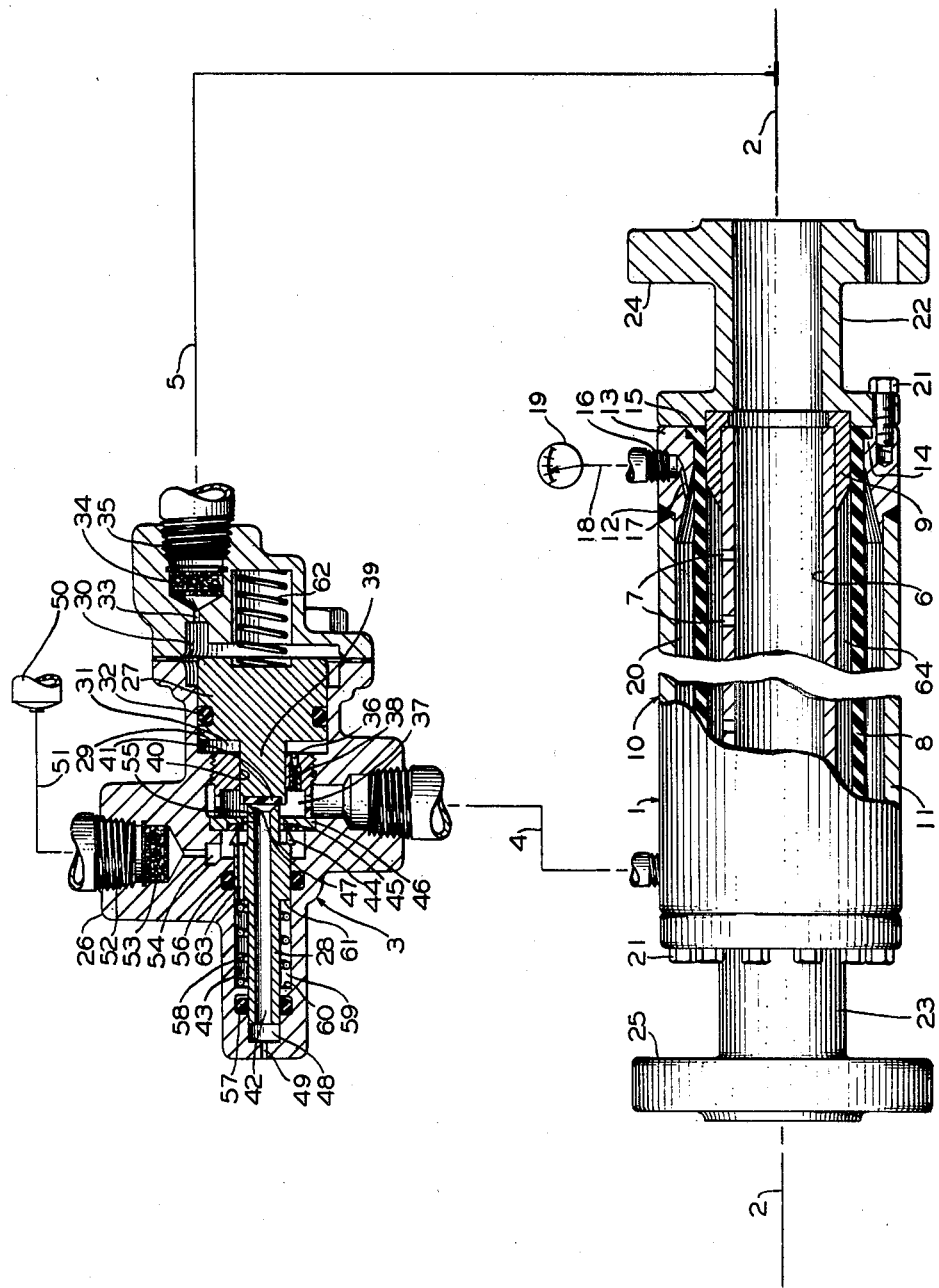
INVENTOR.
*Ellis E. Hewitt*
BY
*Adelbert C. Steinmiller*
Attorney United States Patent Office 2,949,932
Patented Aug. 23, 1960

2,949,932

SURGE DAMPENER APPARATUS

Ellis E. Hewitt, Ruffsdale, Pa., assignor to Westinghouse Air Brake Company, Wilmerding, Pa., a corporation of Pennsylvania Filed June 18, 1959, Ser. No. 821,273

6 Claims. (Cl. 137—593)

This invention relates to devices for dampening, absorbing and suppressing undesired pulsations or sudden surges in fluid pipe lines, such as are used for carrying chemical solutions under pressure or in mud pump installations on well digging apparatus, and more particularly to such apparatus including dampeners in unattended locations having expansible resilient sleeve means subject externally to gases or fluids under variable pressure and surrounding a perforated tubular mandrel to absorb surges of fluid pressure in a pipe line to which the mandrel is connected.

Dampening or desurger devices are utilized in high pressure fluid pipe lines or control lines for damping fluid pressure surges occurring therein and caused, for example, by a sudden velocity change of the fluid in the lines due to the opening or closing of a valve, or in the discharge line of a fluid pump wherein surges are caused by the fluid pressure pulsations of the pump discharge.

Desurger devices heretofore known have been constructed with a section of conductor pipe or mandrel perforated with a plurality of small holes or throttling orifices leading into a volume formed about the outside of the mandrel by a resilient sleeve of rubber or other suitable material. The resilient sleeve is surrounded by a cushioning chamber to which a compressible gas under pressure is supplied to support the sleeve to allow it to expand with surges of pressure in the mandrel and contract with loss of pressure in the mandrel, thereby absorbing the surge within the resilient sleeve such that the output from the desurger device will as nearly as practicable be of a constant flow pressure.

In prior desurger devices it has been found that the rubber sleeve in the desurger device is of relatively short service life due to the range of variation of pressure within the mandrel and in the space between the mandrel and the resilient sleeve. This range of variation of fluid pressure may be from sub-atmospheric pressure to pressure considerably higher than the normal pressure in the pipe line. In order to support the resilient sleeve against the high pressure in the mandrel, a pressure must be maintained in the cushioning chamber outside the resilient sleeve susbtantially corresponding to the pressure in the pipe line, said pressure being pre-adjusted according to pipe line pressure. In the event of reduction of the fluid pressure inside the mandrel due to reduction of mean pressure in the pipe line, the gas pressure in the cushioning chamber outside the resilient sleeve forces the resilient sleeve against the mandrel and into the holes in the mandrel, with the result that the resilient sleeve becomes extruded into the mandrel holes and is eventually punctured so that leakage occurs therethrough from the inside of the mandrel and pipe line into the cushioning chamber. In lengthy piping systems the desurgers are unattended, but the pressure in the cushioning chamber must often be varied from low gas pressures to high gas pressures according to varying pressures of fluid in the pipe. It is the primary object of this invention to provide apparatus in association with a desurger device for automatically controlling the gas pressure in the cushioning chamber of the desurger device according to variations of the mean pressure in the pipe line such that the pressure in said cushioning chamber is maintained at a pressure substantially equal to the mean fluid pressure in the pipe line at all times, thereby preventing the resilient sleeve from being extruded into the orifices in the mandrel and punctured when the mean fluid pressure in the pipe is reduced.

According to the invention, there is provided a relay valve device operable responsively to the fluid pressure in a pipe line to automatically regulate the supply of gas under pressure from a separate source to the cushioning chamber of an unattended desurger device in such a manner that the pressure in said cushioning chamber is maintained substantially equal to mean fluid pressure in the pipe line as that pressure varies. Sudden surges of pressure in the pipe are absorbed by the resilient sleeve, but in the event of a large controlled drop in fluid pressure in the pipe line due to change in pipe line operating pressure, the relay valve device effects an equal drop of gas pressure in the cushioning chamber thereby preventing the resilient sleeve from being harmfully forced against the mandrel and extruded into the perforations therein by the preponderantly higher pressures in the cushioning chamber if the corresponding pressure reduction were not effected.

In the single figure of the accompanying drawing there is shown a diagrammatic view of a surge dampener apparatus in which the desurger device and accompanying relay valve device are shown sectionally in disproportionate scale for clarity.

Description

Referring to the drawing, the surge dampener apparatus comprises a desurger device 1 connected in a pipe line 2 and an associated relay valve device 3 connected to said desurger and pipe line 2 by branch pipes 4 and 5 respectively.

The desurger device 1 comprises a perforated mandrel 6 having a plurality of circumferentially spaced rows of throttling orifices 7 of predetermined diameter and spacing. Disposed around the mandrel 6 is a resilient sleeve 8 spaced away from the mandrel 6, by end cups 9 (one of which is shown) on each end of the mandrel.

Disposed around the resilient sleeve 8 is a housing 10 comprising a cylindrical portion 11 having secured thereto at both ends, as by welding at 12, end rings 13 (one of which is shown), the end rings having inwardly extending annular lips 14 for making a pressurized sealed contact with flanges 15 on the ends of the resilient sleeve 8.

Each end ring 13 (only the right-hand ring being illustrated) has a tapped bore or port 16 and a passage 17 through the wall thereof. The port 16 in the right-hand ring 13 is connected by a pipe 18 to a pressure gauge 19 and the port (not shown) in the left-hand ring 13 is connected by the pipe 4 to relay valve 3 which regulates the supply of fluid under pressure to an annular cushioning chamber 20 formed between the cylindrical portion 11 of the housing 10 and the resilient sleeve 8.

Suitably attached to the end rings 13, as by bolts or screws 21, are two coupling members 22 and 23 having respective flanges 24 and 25 adapted to be suitably connected to corresponding flanged fittings on the main pipe sections constituting the piping system or line, indicated herein by pipe 2 extending from both ends of the desurger.

The relay valve 3 is comprised of a housing 26 containing a control piston 27 and a valve member 28.

The control piston 27 is slidably positioned in a bore 29 with a chamber 30 on one side and a chamber 31 on the opposite side. An O-ring 32 is located in an encircling groove in the piston 27 to seal against communication between the chambers 30 and 31. The chamber 30 is connected to the pipe 2 through a passage 33, a strainer 34 and a threaded port 35, and branch pipe 5 so that pressure variations in the pipe 2 are transmitted to the chamber 30. The chamber 31 is connected via a passage 36 to a chamber 37, which in turn is connected to branch pipe 4 leading to the desurger cushioning chamber 20. A choke 38 is inserted in the passage 36 to prevent sudden small surges in pressure from overworking the relay valve. A stem or plunger 39 extends from the left-hand side of the control piston 27 slidably through a bore 40, said plunger 39 having a valve seat 41 on the free end thereof for engagement with the right-hand end of the valve member 28.

The valve member 28 comprises a generally tubular body, having a central passage 42 therethrough, positioned in a bore 43, said valve member being in the housing 26. The valve member 28 includes two circular valves: the supply valve 44 formed encircling the outside of the valve member 28 and adapted to seat on a valve seat 45 positioned in a seating ring 46 located in the housing 26; and the vent valve 47 formed at the right-hand extremity of the passage 42 adapted to seat on the valve seat 41 on the left-hand or free end of the plunger 39 of the control piston 27.

A chamber 48 connects an atmospheric port 49 to the chamber 37 via the passage 42 through the valve member 28 when the vent valve 47 is unseated from the valve seat 41 on the plunger 39. A suitable source of supply of compressible fluid under pressure, such as gas or air under pressure, shown herein as reservoir 50 is connected, via a pipe 51, a threaded bore 52, a strainer 53, and a chamber 54 encircling the supply valve 44, past valve 44 when unseated from the valve seat 45, and through an annular concentric passage 55 around the right-hand end of valve member 28 to the chamber 37, and thence via branch pipe 4 to the cushioning chamber 20. Sealing rings 56 and 57 located in grooves in housing 26 are positioned to prevent leakage of fluid under pressure between chambers 54 and 48.

A spring 58 is housed in a spring chamber 59 encircling the valve member 28 in a manner to butt against a shoulder 60 on the housing 26 and a shoulder 61 on the valve member 28 to bias the valve member 28 to the right to tend to seat the valve 44 on the valve seat 45. A spring 62 is housed in the chamber 30 to bias the control piston 27 and plunger 39 to the left to tend to seat the valve 47 on the valve seat 41. The spring 62 is constructed to have less biasing pressure than the spring 58 so as to merely seat the valve 47 and not unseat the valve 44 unless sufficiently assisted by fluid under pressure in chamber 30.

A passage 63 is formed in the valve member 28 between chamber 54 and spring chamber 59 to prevent air or gas trapped in the chamber 59 from having a dampening effect on movement of the valve member 28 to the left.

Operation

In operation, fluid under pressure flows from pipe 2 through the mandrel 6 of the desurger from right to left as seen in the drawing. A sudden pressure surge in pipe 2 is transmitted through the orifices 7 to a chamber 64 between the mandrel 6 and the resilient sleeve 8 tending to expand the sleeve 8 outwardly against the fluid pressure in the cushioning chamber 20 to absorb said sudden surge of pressure. In previous desurgers the fluid pressure in the cushioning chamber is either pre-set at one pressure or manually regulated according to the pipe line pressure with the resilient sleeve absorbing sudden surges as just described. In the present apparatus, the desurger apparatus is utilized where it is unattended and the mean pipe line pressure may vary greatly under different situations, thereby, although unattended, still requiring varied pressures in the cushioning chamber 20 according to the mean pressure of fluid being transmitted in the pipe 2. If the mean fluid pressure in the pipe 2 is increased, the pressure increase is transmitted via branch pipe 5 to the chamber 30 to act on piston 27 and move said piston to the left. As piston 27 moves to the left, the plunger 39 moves the valve seat 41 against the valve 47 to seal off the venting of chamber 37 via passage 42, and slides the valve member 28 to the left to unseat the valve 44 from the valve seat 45 and permit gas under pressure from reservoir 50 to flow through branch pipe 51, bore 52, strainer 53, chamber 54, past the unseated valve 44 and passage 55 to chamber 37 and branch pipe 4 to cushioning chamber 20 of the desurger to oppose the increased mean fluid under pressure in chamber 64 acting on the sleeve 8. When the pressure in chambers 20 and 31 equals that in the pipe line 2 and the chamber 30, the spring 58 being of greater pressure than the spring 62 will cause the valve member 28 to move to the right to a lap position wherein the valves 44 and 47 are both seated on their respective seats, thereby tending to equalize the pressure in chambers 20 and 64 on opposite sides of the sleeve 8. With a drop in the mean pressure in pipe 2 and branch pipe 5, the differential in pressure on opposite sides of piston 27 will be sufficient to move the piston 27 and plunger 39 further to the right to unseat the valve 47 from the valve seat 41 and thereby vent the cushioning chamber 20 via branch pipe 4, chamber 37, passage 42, chamber 48 and passage 49 to maintain the pressure drop in chamber 20 equal to that in chamber 64.

Summarizing, it can thus be seen that an increase of mean pressure in pipe 2 and chamber 64 is simultaneously felt in branch pipe 5 and chamber 30 to cause the piston 27 and plunger 39 to move to the left to unseat the valve 44 and permit an equal increase of gas under pressure from the reservoir 50 to the branch pipe 4 and cushioning chamber 20 on the opposite side of the sleeve 8. When the pressure in chambers 20 and 31 equals the mean pressure in pipe 2 and chamber 30, the spring 58 will cause the valves 44 and 47 to seat in a lap position. A decrease of mean pressure in pipe 2 and in chamber 64 is compensated by a simultaneous decrease in chamber 30 of the relay valve 3 to move the piston 27 and plunger 39 to the right causing unseating of valve 47 from valve seat 41 to effect venting of chamber 20 and thereby tending to equalize the pressures in chambers 20 and 64.

Having now described the invention, what I claim as new and desire to secure by Letters Patent, is:

1. Surge dampener apparatus for use in a pipe line to dampen sudden surges of fluid pressure therein, said apparatus comprising in combination, a desurger device of the type having a movable member interposed between and subject in respective chambers on opposite sides thereof to the pressure of fluid in the pipe line and to the variable pressure of a compressible gas which by yieldingly permitting movement of the said movable member in response to sudden pressure surges in the pipe line serves to dampen such sudden pipe line pressure surges, a source of gas under pressure, and relay valve means operatively responsive according to gradually occurring mean pressure variations in the pipe line for correspondingly controlling the supply of gas under pressure from said source to the corresponding chamber at one side of the movable member so as to maintain substantial equivalency thereof with the pressure in the other chamber notwithstanding variation of the mean pressure in the pipe line.

2. Surge dampener apparatus for use with a pipe line to minimize surges of pressure therein, said apparatus comprising in combination, a desurger device of the type utilizing a resilient sleeve member encircling a perforated mandrel in which fluid under pressure supplied from the pipe line varies gradually from one pressure to another pressure and being subject to sudden pressure surges and rarefactions, cushioning chamber means encircling said resilient sleeve member and effective when charged with gas under pressure to dampen said pressure surges, reservoir means constituting a source of supply of gas under pressure, and relay valve means operative responsively to gradually occurring mean pressure variations in the pipe line for controlling the supply of gas under pressure from said reservoir means to said cushioning chamber means to maintain a pressure in said cushioning chamber means substantially equivalent to the mean pressure of fluid in the pipe line.

3. Surge dampener apparatus for use with a pipe line to minimize surges of pressure therein, said apparatus comprising in combination, a desurger device of the type utilizing a resilient sleeve member encircling a perforated mandrel in which fluid under pressure supplied from the pipe line varies gradually from one pressure to another pressure and is subject to sudden pressure surges and rarefactions, cushioning chamber means encircling said resilient sleeve member and effective when charged with gas under pressure to dampen said pressure surges, reservoir means constituting a source of supply of gas under pressure, supply valve means operatively responsive to gradually occurring mean pressure variations in the pipe line for controlling the supply of gas under pressure from said reservoir means to said cushioning chamber means, and vent valve means operatively responsive to gradually occurring mean pressure variations in the pipe line for controlling venting of said cushioning chamber means, said supply valve means and said vent valve means cooperating to maintain the pressure in said cushioning chamber means substantially equivalent to the mean pressure of fluid in the pipe line.

4. Surge dampener apparatus for use with a pipe line to minimize surges of pressure therein, said apparatus comprising in combination, a desurger device of the type utilizing a resilient sleeve member encircling a perforated mandrel in which fluid under pressure supplied from the pipe line varies gradually from one pressure to another pressure and is subject to sudden pressure surges and rarefactions, cushioning chamber means encircling said resilient sleeve member and effective when charged with gas under pressure to dampen said pressure surges, reservoir means constituting a source of supply of gas under pressure, supply valve means for controlling supply of gas under pressure from said reservoir means to said cushioning chamber means, vent valve means for controlling venting of gas under pressure from said cushioning chamber means, and control piston means operatively responsive to gradually occurring variations of mean pressure of fluid in the pipe line to control operation of said supply valve means and of said vent valve means to maintain a gas pressure in said cushioning chamber means substantially equivalent to the mean fluid pressure in said pipe line.

5. Surge dampener apparatus for use with a pipe line to minimize surges of pressure therein, said apparatus comprising in combination, a desurger device of the type utilizing a resilient sleeve member encircling a perforated mandrel in which fluid under pressure supplied from the pipe line varies gradually from one pressure to another pressure and is subject to sudden pressure surges and rarefactions, cushioning chamber means encircling said resilient sleeve member and effective when charged with gas under pressure to dampen said pressure surges, reservoir means constituting a source of supply of gas under pressure, supply valve means for controlling supply of gas under pressure from said reservoir means to said cushioning chamber means, vent valve means for controlling venting of gas under pressure from said cushioning chamber means, and control piston means operably responsive to a gradual increase of mean pressure in said pipe line to cause said vent valve to prevent venting of said cushioning chamber means and said supply valve means to be effective to permit gas under pressure to be supplied to said cushioning chamber means to effect an increase in gas under pressure in said cushioning chamber means to a degree substantially equivalent to the said increase in the mean pipe line pressure.

6. Surge dampener apparatus for use with a pipe line to minimize surges of pressure therein, said apparatus comprising in combination, a desurger device of the type utilizing a resilient sleeve member encircling a perforated mandrel in which fluid under pressure supplied from the pipe line varies gradually from one pressure to another pressure and is subject to sudden pressure surges and rarefactions, cushioning chamber means encircling said resilient sleeve member and effective when charged with gas under pressure to dampen said pressure surges, reservoir means constituting a source of supply of gas under pressure, supply valve means for controlling supply of gas under pressure from said reservoir means to said cushioning chamber means, vent valve means for controlling venting of gas under pressure from said cushioning chamber means, and control piston means operably responsive to a gradual decrease of mean pressure in said pipe line to cause said supply valve to prevent supply of gas under pressure to said cushioning chamber means and said vent valve to vent gas under pressure from said cushioning chamber means to thereby effect a decrease in the gas pressure in said cushioning chamber means to a degree substantially equivalent to the said decrease of the mean pressure in the pipe line.

References Cited in the file of this patent
UNITED STATES PATENTS

| | | |
|---|---|---|
| 2,845,951 | Hugley | Aug. 5, 1958 |
| 2,871,870 | Peters | Feb. 3, 1959 |
| 2,875,787 | Evans | Mar. 3, 1959 |